United States Patent Office 3,558,539
Patented Jan. 26, 1971

3,558,539
STABILIZER COMPOSITIONS EMPLOYING FATTY ACID METAL SALTS, EPOXIDIZED MATERIAL, AND ORGANO PHOSPHITES
Perley M. Irish, Jr., Hampden, Mass., assignor to Monsanto Company, St. Louis, Mo., a corporation of Delaware
No Drawing. Filed Feb. 21, 1968, Ser. No. 707,311
Int. Cl. C08f 29/18, 29/24, 45/62
U.S. Cl. 260—23         19 Claims

ABSTRACT OF THE DISCLOSURE

A five-component polyvinyl chloride stabilizer system utilizing metal salts of long-chain monocarboxylic fatty acids, epoxidized organic material, tri-substituted organomonophosphite and tri-substituted organo polyphosphite. The resulting blends, when heat fused to produce articles such as containers, display superior processing stability.

BACKGROUND

In the art of polyvinyl chloride molded plastics, there has been a long felt need for particulate, heat fusible blends, which when heat fused into articles of manufacture, especially containers, display good processing stability. The art knows that stabilized polyvinyl chloride blends with some other polymeric materials, when heat fused, tend to produce more flexible and tough products. However, the art has had difficulty in producing both stabilized polyvinyl chloride and stabilized polyvinyl chloride blends with some other polymeric materials which can be heat fused into products, having good processing stability.

Group II (of the Periodic Table) metal salts of monocarboxylic fatty acids (especially mixtures of calcium and zinc salts of such acids) are known to the art to be useful as stabilizers for polyvinyl chloride and polyvinyl chloride blends. However, these salts by themselves suffer from the disadvantage that a transparent, heat fused polyvinyl chloride film has haze, high color, and poor long-term heat stability as a result of their incorporation. There has now been discovered a new five-component stabilizer system which utilizes calcium and zinc salts of monocarboxylic fatty acids, but which overcomes these disadvantages and unexpectedly improves the processing stability of particulate heat fusible polyvinyl chloride and polyvinyl chloride blends.

The resulting blends, when conventionally heat fused to produce transparent articles of manufacture, such as containers and the like, have superior processing stability (as measured, for example, in terms of clarity and color of processed transparent film). Although each component of this novel stabilizer composition is generally known to have utility for stabilizing polyvinyl chloride blends, not one of such components by itself, or even combined with another or others of such components to form subcombinations of this new stabilizer composition, has the capacity to produce equivalent processing stability when combined with polyvinyl chloride. Surprisingly, and unexpectedly, when all five components are present, there results a stabilizer composition which can be combined, for example, with a mixture of polyvinyl chloride and rubbery modifier to produce a blend which when heat fused has unexpectedly superior processing stability. These five components can be considered to coact synergistically.

SUMMARY

This invention relates to new and very useful stabilizer compositions which comprise (total assay weight basis of a given stabilizer composition):

(a) from about .02 to 0.5 part by weight of at least one zinc salt of a long-chain monocarboxylic fatty acid having a molecular weight of from about 100 through 300, (b) from about 0.02 to 1.0 part by weight of at least one member selected from the group consisting of aluminum, calcium and magnesium salts of long-chain monocarboxylic fatty acids each having a molecular weight of from about 100 through 300, (c) from about 1.0 to 30.0 parts by weight of an epoxidized organic material having an oxirane number of from about 3.5 through 13.0 and having a molecular weight of from about 275 through 1800, (d) from about 0.01 to 3.0 parts by weight of a tri-substituted organo monophosphite having from about 5 through 21 carbon atoms per substituent group, and (e) from about .05 to 3.0 parts by weight of a tri-substituted organo polyphosphite having the structure:

(I)
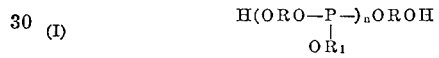

where R is the divalent residue of hydrogenated 4,4 isopropylidene diphenol, $R_1$ is one or several members selected from the group consisting of aryl of 6 through 10 carbon atoms each, and alkyl of 1 through 20 carbon atoms each, and $n$ is an integer of at least 2, (and preferably is smaller than 5).

Optionally, but preferably, stabilizer compositions of this invention may contain either a polyhydroxy aliphatic alcohol having from about 3 through 10 carbon atoms per molecule and having from about 2 through 8 hydroxyl groups per molecule or a monoester of such an alcohol with long-chain monocarboxylic fatty acids each having a molecular weight of from about 50 through 300, or both. Such alcohols when used are present in an amount up to about 2.0 parts by weight, while such esters when used are present in an amount up to about 3.0 parts by weight. In molecules of such alcohols (whether or not in such a monoester) there is preferably not more than one hydroxyl group per carbon atom.

Also, optionally, stabilizer compositions of this invention may contain stannous salts, of long-chain monocarboxylic fatty acids each having a molecular weight of from about 100 through 300. Stannous salts of such acids when used are present in an amount up to about 0.25 parts by weight.

The epoxidized vegetable oil and the monomeric phosphite are typically each in a liquid state; the other components are typically each in the form of solids. Preferably, all solid components each have starting average particle sizes, respectively, of less than about 140 mesh (USBS standard sieves).

The respective amounts of each component in broad and in preferred stabilizer compositions of this invention are given in Table I below:

TABLE I

| COMPONENT | Parts by weight [1] | |
|---|---|---|
| | Broad range, approximate | Preferred range, approximate |
| Main Components: | | |
| a. Zinc salt of long-chain fatty monocarboxylic acid(s) | 0.02–0.5 | 0.08–0.20 |
| b. Aluminum, calcium, or magnesium metal salts of long-chain monocarboxylic fatty acid(s) | 0.02–1.0 | 0.02–0.75 |
| c. Epoxidized organic material | 1.0.30.0 | 3–7 |
| d. Monophosphite | 0.01–3.0 | 0.1–1 |
| e. Polyphosphite | 0.05–3.0 | 0.2–0.7 |
| Optional Components: | | |
| f. Polyhydroxy aliphatic alcohol | 0–2.0 | 0.1–0.5 |
| g. Polyhydroxy alcohol fatty acid monoester | 0–3.0 | 0.5–2.0 |
| h. Stannous salt of long-chain monocarboxylic fatty acid(s) | 0–0.25 | 0.25 |

[1] Based on the total assay weight of a given stabilizer composition of this invention (so as to discount the possible presence of water or other contaminants from the total). Typically, 1–40 parts of such a stabilizer composition is used with 100 parts of a polymer composition such as described below.

In general, any long-chain aliphatic monocarboxylic fatty acid (including monolower alkyl substituted and mono hydroxyl substituted such acids) having a molecular weight ranging from about 100 to 300 can be used in making the zinc, aluminum, calcium, magnesium, and stannous salts of such acids for use in the compositions of this invention. The term "lower" in reference to alkyl as used here has reference to less than 6 carbon atoms. Thus, suitable fatty acids include stearic, myristic, lauric, oleic, ricinoleic, ethylhexanoic, and the like. These salts may be prepared as pure chemical entities or by coprecipitation. Of the aluminum, calcium and magnesium salts, calcium is preferred for a non-toxic system. Methods for the manufacture of such salts are conventional and well known to those of ordinary skill in the art and do not constitute a part of the present invention.

Similarly, for use in this invention, one may employ any epoxidized organic material having an oxirane number of from about 3.5 to 13.0 (preferably about 6.0 through 7.1) and having a molecular weight of from 275 to 1800 (preferably about 800 to 1200). Such materials with iodine numbers less than about 6 are preferred. A particularly convenient epoxidized organic material is that known as epoxidized soya bean oil which has an oxirane number of about 6.8 and an average molecular weight of about 1000. Examples of other suitable epoxidized organic materials include: alkanes having from about 15 to 24 carbon atoms per molecule and sufficient epoxy groups per molecule to produce an oxirane number of from 3.5 through 13; epoxidized carboxylic acids and esters thereof, and mixtures of such compounds in oils, containing sufficient epoxy groups per molecule to produce an oxirane number of from 3.5 to 13 (e.g. epoxidized linseed oil, castor oil, perilla, corn oil, oleic acid, cotton seed oil, sunflower oil, safflower oil, tung oil, the methyl ester of linseed oil fatty acids, sesame oil, poppy seed oil, walnut oil, peanut oil, olive oil, rape seed oil, whale oil, dehydrated castor oil, and the like); reaction products of alkyl sulfonyl chlorides with a glycidol in the presence of ammonia (where the alkyl group contains about 15 or more carbon atoms) to produce an epoxy containing product having an oxirane number of from about 3.5 through 13; and the like.

Similarly, any tri-substituted organo monophosphite having from about 5 through 20 carbon atoms per substituent group may be used. Among the many such compounds known to the prior art are such examples as tris(alkaryl) phosphites, such as tris(p-nonylphenyl) phosphite; triaryl phosphites, such as triphenyl phosphite; diarylalkyl phosphites, such as diphenyl nonyl phosphite, aryl dialkyl phosphites, such as phenyl di(ethyl) phosphite, trialkyl phosphites, such as tripropyl phosphite, and the like. Tris (alkaryl) phosphites are preferred.

Similarly any tri-substituted organo polyphosphite as defined above in Formula (I) above can be used. Such polyphosphites are described in U.S. Pat. 3,341,629 to Larrison. A particularly preferred polyphosphite is the hydrogenated 4,4'-isopropylidene-diphenol such that the finished product has a molecular weight in the range of from about 1200 through 6,000 (2400 through 3000 being preferred), and a phosphorous content of about 6.2 through 6.9 weight percent. Such a polyphosphite preferably has a residual free phenol content of less than about 2.2 weight percent (based on total weight of such a polyphosphite).

Similarly, any polyhydroxy aliphatic alcohol as described above is suitable. Examples include sorbitol, mannitol, pentaerythritol (preferred), glycerol, glucose, and the like.

Similarly, any monoester of such an alcohol with such fatty monocarboxylic acids as above described is suitable. Examples include sorbitol monostearate, glycerol monostearate, and the like.

The stabilizer compositions of this invention either can be prepared in the form of mixtures (preferably uniform), or they can be mixed separately with polyvinyl chloride (and, if used, rubbery modifier) to produce directly heat fusible, uniform blends of stabilizer composition, and polyvinyl chloride. Typical stabilizer uniform mixtures are in the form of pastes, while typical uniform polymer blends are in the form of particulate, free flowing solids.

When making a uniformly blended stabilizer system of this invention, and when making a uniform mixture of such system with a polyvinyl chloride (and, optionally, a rubbery modifier), it is convenient and suitable to blend the respective components together in an appropriate conventional blender until uniformity is reached. Suitable mechanical blenders include chain can mixers, ball mills, ribbon blenders, Henschel blenders, and the like, depending upon circumstances.

The term "polyvinyl chloride" as used herein refers to a polymer produced not only by polymerizing vinyl chloride monomer to produce polyvinyl chloride homopolymer, but also by copolymerizing vinyl chloride monomer with other ethylenically unsaturated aliphatic monomers copolymerizable therewith to produce polyvinyl chloride interpolymers. Suitable such other ethylenically unsaturated aliphatic monomers copolymerizable with vinyl chloride to produce polyvinyl chloride include olefins, such as ethylene, propylene, and the like; vinylidene monomers, such as vinyl esters of monobasic organic acids containing 1–20 carbon atoms (e.g. vinyl ether, 2-ethyl hexyl vinyl ether, benzyl vinyl ether, etc.) and vinylidene chloride; acyl acrylate esters in which the alkyl group contains 1–20 carbon atoms (e.g. methyl acrylate, butyl acrylate, octadecyl acrylate, etc.); the corresponding alkyl methacrylate esters; dialkyl esters of dibasic organic acids in which the alkyl groups contain 2–8 carbon atoms (e.g. dibutyl fumarate, diethyl maleate, etc.); and the like.

Preferred polyvinyl chloride polymers have chlorine contents ranging from about 45.0 to 56.7 and have molecular weights such that a 0.4 weight percent solution of such polymer in cyclohexanone at 25° C. has a specific viscosity of from about 0.2 to 0.5. More preferred specific viscosities range from about 0.3 to 0.4. A preferred class of polyvinyl chloride is polyvinyl chloride homopolymers. Another preferred class of polyvinyl chloride is those produced by polymerizing a mixture of from about 80 to 100 weight percent of vinyl chloride with, correspondingly, from 0 to about 20 weight percent of an ethylenically unsaturated, aliphatic monomer selected from the group consisting of ethylene, propylene, vinyl acetate, 2-ethylhexyl vinyl ether, and the like. In general, one should choose a polyvinyl chloride for use in the present invention which will offer most satisfactory properties for a particular desired heat fused product.

When using a polymeric organic rubbery modified with polyvinyl chloride in practicing this invention (for example, to improve product toughness), it is convenient to use a polymeric material having a glass phase transition temperature below about 0° C. (preferably below about −25° C.), and having a Young's Modulus of less than about 100,000 p.s.i. While such rubbery modifier need have no particular chemical structure, a preferred class of such rubbery modifiers is formed of at least two and, preferably even three copolymerizable monomers. Examples of such preferred rubbery modifiers include acrylonitrile/butadiene/styrene, methylmethacrylate/butadiene/styrene, ethylene/vinyl acetate, graft copolymers of methylmethacrylate/styrene superstrate on butadiene/styrene substrate, and the like. Other suitable rubbery modifiers include chlorinated polyethylene, graft copolymers having a rubbery substrate, and the like. In general, one should choose a rubbery modifier for blending with polyvinyl chloride in practicing this invention which will offer most satisfactory properties in a particular desired heat fused product. When using a rubbery modifier, it is typical and preferred to employ from about 3 to 20 parts by weight of such modifier for each 100 parts by weight of polyvinyl chloride, although up to 30 parts can be used (based on total polymer).

It is convenient, though not necessary, when preparing a blend of a stabilizer composition of this invention with polyvinyl chloride (and, optionally, a rubbery modifier) to use such polymeric materials in the form of particles at least 90 weight percent of which pass through a 40 mesh USBS sieve. It will be appreciated herein that reference to a heat fusable blend of the invention includes blends comprising both a stabilizer composition of this invention and polyvinyl chloride (with rubbery modifier optionally being present). Such blend may exist in various physical forms particularly in particulate forms, including pellets cut from a fused mass of the blend, or as an unfused physical mixture. Selection of a particular particle form for a given product blend is optional, and is influenced by the particular end use to which a given product blend is to be put. In general, the manufacture of polyvinyl chloride and of rubbery modifier is well known to those of ordinary skill in the art and does not form a part of the present invention.

The polyvinyl chloride and the rubbery interpolymer can be preblended together before being admixed with a stabilizer composition of the invention, or not, as desired. Preblending can be accomplished by simple, conventional physical mixing using, for example, a ribbon blender, or the like.

Optionally, a heat fusible particulate, stabilized polyvinyl chloride blend of the invention, and articles of manufacture made therefrom may contain processing aids as those skilled in the art will appreciate. Typical processing aids are thermoplastic polymers having molecular weights in excess of about 15,000. Examples include polymers and interpolymers of styrene, methylmethacrylate, acrylonitrile, alpha-methyl styrene, methacrylonitrile, and the like. These processing aids are typically in the form of finely divided powders. Such processing aids can be incorporated into a blend by any convenient mixing means and for purposes of practicing this invention may be considered to constitute a part of the rubbery modifier.

When a particulate, heat fusible blend is being made from a previously prepared stabilizer composition of this invention, it is convenient to add this composition with physical mixing to the polyvinyl chloride, or to a preblend of polyvinyl chloride and rubbery modifier until uniformity is achieved. Any convenient mixing procedure may be used, i.e. Henschel type or ribbon blenders are frequently used, depending upon further processing plans. In general, any convenient conventional mixing procedure or equipment may be used.

In summary, a heat fusible, particulate, stabilized polyvinyl blend of the invention (whether or not it contains rubbery modifier) contains both a polymer compositions (which may include processing aids) and a stabilizer composition (the latter being as detailed in Table 1 above in content). The polymer composition comprises at least about 70 parts by weight of polyvinyl chloride with the balance of up to 100 parts by weight thereof being rubbery modifier. For each 100 parts by weight of such polymer composition, there are employed from about 1 through 40 parts by weight of a stabilizer composition of this invention. Preferably one uses from about 3 through 20 parts by weight of such stabilizer composition per 100 parts by weight of such polymer composition.

A preferred procedure for making a heat fusible, particulate, stabilized polyvinyl chloride blend of this invention involves, as a first step, the dissolution of the polyphosphate material in the epoxidized organic material. Such dissolution can be accomplished, for example, by placing the epoxidized material in a vessel, heating such to about 100° C., (or approximately 30° over the melting point of the polyphosphite), and adding the polyphosphite with stirring to the heated epoxidized material until solution is effected. After solution, the mixture may be cooled and stored, if desired. The other three components of the stabilizer system can be added to the above solution with mixing. The resulting stabilizer composition in turn can be mixed together with a polymer composition.

As indicated above, articles made from heat fusible blends comprising polymer composition and stabilizer composition of this invention display superior processing stability. Such processing stability is conveniently measured in terms of clarity and color. For purposes of this invention, clarity and color of such a heat fusible blend are measured by first forming a film or sheeting from such blend, as by compression molding samples of haetfused transparent mill-rolled sheeting. Such sheeting is conveniently prepared by forming such blend into sheeting about 2 millimeters thick on a two-roll rubber mill having a roll speed ratio of about 1.15 to 1. Such compression molded samples are prepared by cutting pieces from mill rolled sheeting (at about 2±0.25 mm. thickness), placing them in a mold with cavity dimensions of about 50 x 50 x 0.66 mm. and molding between press-polished platents. A typical molding cycle consists of placing the above sample in a preheated hydraulic molding press at 175±2° C. and about 70 kg./cm.$^2$ pressure for 2 minutes to soften the sample. Pressure is then raised to 240±70 kg./cm.$^2$ for one minute to mold the sample. The sample is then cooled in the press to 50–60% C. and removed for testing. Any convenient film thickness may be used in evaluating the stabilizer compositions of this invention. For convenience, 0.89±.05 millimeter compression molded films are used in the following examples.

For purposes of this invention, clarity is measured by determining a haze value or haze factor for such a film sample. Haze value is determined by passing a beam from a light source through such a sample and then determining first the scatter and then the transmission therethrough. This ratio of light transmitted through such a film sample is measured using a black standard background to light transmitted through such film sample measured using a white standard background is expressed as percent haze. These measurements are conveniently made using a General Electric Spectrophotometer and a light source having a wave length of 550 m$\mu$.

For purposes of this invention, color is measured by a static test method wherein a series of samples from the mill roll sheets are systematically degraded under conditions of elevated temperature. The time required for total degradation to occur is called the oven heat stability and is obtained by systematically and periodically removing individual sample sheets from an oven maintained at 192° C. Specifically, color and color stability (annealed color) is measured on molded films in terms of a yellowness index calculated as $Y_1$ (designates Yellowness Index):

(II)
$$Y_1 = \frac{X_{ce} - 0.992 Z_{ce}}{Y_{ce}}$$

where $X_{ce}$, $Y_{ce}$, and $Z_{ce}$ are percent reflectance measurements made, for example, using the X, Y and Z tristimulus filters of a so-called IDL Color Eye apparatus (a trademark of, and a product of, Instrument Development Laboratories, Attleboro, Mass.). Those skilled in the art will appreciate that the X, Y, and Z filters integrate the red, blue and yellow omission from a sample so that one obtains by this technique a broad spectrum evaluation of the color properties of a given sample film. In such measurements, "initial color index" ($Y_0$) indicates the color of sample film molded from the mill rolled sheet (such as described above). Similarly, "annealed yellowness index" ($Y_{10}$) indicates the color developed in such a sample film molded from a mill rolled sample which has been exposed or annealed for 10 minutes in a circulating air oven regulated at 192° C. The difference between index readings is a measure of color stability that will be encountered in shear-heat processing operations.

The particulate, heat fusible blends of this invention can be conventionally processed by heat fusion techniques to produce a wide variety of products including sheets, tubes, containers, and the like. These blends are particularly well suited for use in making articles which are to have relatively uniform transparent walls, especially containers. Typical containers have integral bottom wall portions and side wall portions which together define and enclose a centrally disposed cavity, and further have defined therein orifice means for ingress and egress into said cavity. Such containers are preferably transparent and are made by blow molding a blend of polymer composition (as described above) and of stabilizer composition of this invention. Typical article wall thickness range from about 0.25 to 1.5 millimeters, although smaller and greater wall thicknesses can, of course, be employed.

The stabilizer compositions of this invention are particularly useful in polyvinyl chloride blends intended for use in the manufacture of blow molded hollow articles, such as bottles and toys, especially transparent articles. Suitable conventional blow molding equipment consists of an extruder having, for example, an integrated mold clamping and blowing unit. For high quality products, it is convenient to use a centrally fed head and have the head and die fully streamlined. The extruder will normally have a length to diameter ratio of at least 16:1 and the screw a compression ratio of at least 2:1, obtained by constant pitch with decreasing depth of flight. All surfaces in contact with hot polyvinyl chloride blend should be corrosion resistant, for example, either chromium or nickel plated to prevent corrosion. It is preferred to extrude at as low a temperature as is permitted by the rheology of the polymer composition and without undue machine overload. Typical extrudate temperatures and pressures vary from about 150 to 210° C. and 1500 to 5000 p.s.i. as those skilled in the art will appreciate.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Example 1

A stabilizer composition of this invention is prepared by uniformly admixing together at room temperature and pressure to form a smooth paste the following components in the respective amounts (parts by weight) indicated for each:

| | Parts |
|---|---|
| Calcium ricinoleate | 12 |
| Zinc stearate | 15 |
| Pentaerythritol | 40 |
| Monophosphite | 30 |
| Polyphosphite | 50 |
| Epoxidized soya bean oil | 100 |

The monophosphite is tri (mixed mono and di nonylphenyl) phosphite (which contains not more than 1 percent by weight of tri-isopropanolamine). The polyphosphite is hydrogenated 4,4'-isopropylidene-diphenol-phosphite ester product produced by the condensation of 1 mole of triphenyl phosphite and 1.5 moles of hydrogenated 4,4'-isopropylidene-diphenol such that the finished product has a molecular weight in the range of 2,400–3,000, a phosphorous content of 6.2–6.9 percent, and contains less than about 2.2 percent by weight of residual free phenol. The epoxidized soya bean oil has an oxirane number of about 6.9 and an iodine number below 6, and an average molecular weight of about 1000.

As a preliminary step, the epoxidized soya bean oil is first placed in a vessel and heated to about 100° C. and thereafter the polyphospite and the monophosphite are added thereto with stirring until a solution of monophosphite and polyphosphite in the epoxidized soya bean oil is effectuated. This resulting solution is cooled to room temperature and thereafter the remaining three components are separately added thereto and blended thereinto using a beaker and spatula. The product is a stabilizer composition of the invention in paste form.

Alternately, if desired, the remaining three components (solids) can be separately mechanically blended together. Then such resulting solution and such blend can be added to a polymer composition to form in situ a stabilizer composition of this invention.

Examples 2, 3, and 4

The stabilizer composition of Example 1 is admixed with each of three different respective polymer compositions to form three different heat fusible particulate stabilized polyvinyl chloride blends. In preparing each blend, additional epoxidized soya bean oil of the type used in preparing the stabilizer composition of Example 1 is added to each blend. The stabilizer composition of Example 1 is admixed with each polymer composition using a small ribbon blender to produce a uniform mixture of polymer and stabilizer composition.

Each product blend is formed into heat fused transparent sheeting about 2 millimeters thick on a two-roll rubber mill having a roll speed ratio of about 1.15 to 1. Roll temperature of the lead roll is about 160° C. while roll temperature of the following roll is about 155° C., the pressure between rolls being maintained so as to have a rolling bank of blend in the nip region.

The resulting sheet produced from each blend is then molded and tested for haze (clarity) and color by the tests above described. Details and results are given below in Table 2.

TABLE 2

| Components | Example 2 | Example 3 | Example 4 |
|---|---|---|---|
| PVC homopolymer [1] | 100 | 90 | 85 |
| Methylmethacrylate/butadiene/styrene [2] | | 10 | 10 |
| Chlorinated polyethylene [3] | | | 5 |
| Polymethylmethacrylate [4] | 2 | 2 | 2 |
| Stabilizer of Example 1 | 2.5 | 2.5 | 2.5 |
| Epoxidized soya bean oil [5] | 4 | 4 | 4 |
| Mineral oil [6] | 0.5 | 0.5 | 0.5 |
| Haze (clarity) at 550 mµ and 35 mil, percent [7] | 2.4 | 2.4 | 9.4 |
| Yellowness index, $Y_0$ [7] | 8.8 | 2.9 | 13.1 |
| Yellowness index, $Y_{10}$ [7] | 13.7 | 13.1 | 20.2 |
| Heat stability [7] | 25 | 28 | 27 |

[1] The polyvinyl chloride homopolymer is in the form of particles 100 percent of which pass through a 40 USBS mesh sieve. This homopolymer has a specific viscosity ($\eta_{sp}$) of 0.39. This homopolymer is available from the Monsanto Company as Opalon 630.
[2] The methylmethacrylate/butadiene/styrene rubbery modifier is in the form of particles 100 percent of which pass through a 24 USBS mesh sieve. The methylmethacrylate/butadiene/styrene rubbery modifier is a graft copolymer of 90 percent grafting efficiency of styrene/methylmethacrylate copolymer superstrate on a styrene/butadiene substrate. The product is formed from about 30 percent methylmethacrylate, 30 percent styrene, and about 30 percent butadiene. A minor amount of styrene/methylmethacrylate copolymer is present. This particular methylmethacrylate/butadiene/styrene rubbery modifier is available from the Mitsui and Co., Inc. of the U.S.A. as Kane ACE B-12.
[3] The chlorinated polyethylene rubbery modifier contains 42 percent chlorine, has a melt shear stress of 30 p.s.i. at 100 sec.$^{-1}$ at 190° C., and is in the form of particles ranging from 5 to 60 mesh in size. This particular chlorinated polyethylene is available from the Dow Chemical Company as Tyrin QX 2243.6.
[4] The polymethylmethacrylate is in the form of particles, 92 percent of which pass through a 150 USBS mesh sieve and 80 percent of which pass through a 200 USBS mesh sieve. This polymethylmethacrylate processing aid is available from the Rohm & Haas Co. as Acryloid K-120N.
[5] Same oil as used in stabilizer of Example 1.
[6] The mineral oil has a viscosity (SSU at 100° F.) between 80 and 95, a flash point of 340° F., a pour point at 35° F., and a specific gravity at 25° C. between about 0.835 and 0.865.
[7] Test procedure as described above.

Examples 5 through 15

Polymer blends of the invention are prepared by directly incorporating a stabilizer composition of the invention with a polymer composition.

As a preliminary step in each example, the epoxidized soya bean oil is first placed in a vessel and heated to about 100° C. and thereafter the polyphosphite is added thereto with stirring until solution of polyphosphite in the epoxidized soya bean oil is effectuated. The product solution is cooled to room temperature.

This preblend together with the other components of the stabilizer composition are then added with mixing to the polymer composition used in each example. A ribbon blender is used to prepare the stabilized polymer blend in each example. The polymer components all initially have particle sizes such that substantially 100 weight percent thereof pass a 24 USBS sieve.

Each product blend is formed into heat-fused transparent sheeting about 1 mm. thick on a two-roll rubber mill having a roll speed ratio of about 1.15 to 1. Roll temperature of the lead roll is about 160° C. while roll temperature of the following roll is about 155° C., the pressure between rolls being maintained so as to have a rolling bank of blend in the nip region.

The resulting sheet produced from each blend is then tested for haze (clarity) and color by the tests above described. Details and results are given below in Table 3.

TABLE 3

| Polymer composition | 5 | 6 | 7 | 8 | 9 | 10 | 11 | 12 | 13 | 14 | 15 |
|---|---|---|---|---|---|---|---|---|---|---|---|
| Polyvinyl chloride homopolymer [1] | | 100 | | 90 | 90 | | 90 | 90 | 100 | | 90 |
| Polyvinyl chloride homopolymer [2] | 90 | | 80 | | | 90 | | | | 90 | |
| Methylmethacrylate/butadiene/styrene [3] | 10 | | 20 | 10 | 10 | 10 | 10 | 10 | | 10 | 10 |
| Stabilizer System—zinc salt of long-chain monocarboxylic fatty acid(s): | | | | | | | | | | | |
| Zinc palmitate | | 0.02 | 0.1 | 0.1 | 0.1 | 0.2 | 0.1 | 0.1 | 0.1 | | 0.10 |
| Zinc octoate | 0.5 | | | | | | | | | 0.25 | |
| Aluminum, calcium, magnesium salts of long-chain monocarboxylic fatty acid(s): | | | | | | | | | | | |
| Aluminum palmitate | 0.5 | | 0.1 | | 0.1 | 0.2 | | 0.1 | | 0.25 | |
| Calcium myristate | 0.25 | 0.1 | 0.1 | 0.05 | 0.1 | 0.2 | 0.1 | | 0.05 | 0.25 | 0.1 |
| Magnesium stearate | | | | | | | 0.1 | 0.1 | | | |
| Epoxidized organic material, epoxidized soya bean oil | 3 | 20 | 5 | 5 | 5 | 5 | 5 | 5 | 5 | 5 | 5 |
| Tris (alkaryl) monophosphite, tris(p-nonylphenyl) phosphite | 0.3 | 0.5 | 0.5 | 0.3 | 0.3 | 0.3 | 0.3 | 0.5 | 0.3 | 0.3 | 0.20 |
| Polyphosphite, hydrogenated Bis-phenol A phosphite [4] | 0.5 | 0.5 | 0.5 | 0.5 | 0.5 | 0.5 | 0.5 | 0.5 | 0.5 | 0.5 | 0.50 |
| Polyol, pentaerythritol | 0.25 | | 0.2 | 0.2 | 0.2 | 0.3 | 0.25 | 0.25 | 0.2 | 0.25 | |
| Stannous salt of long-chain monocarboxylic fatty acid, stannous stearate | | | | | 0.25 | | | | | | |
| Monoester of alcohol, glycerol monostearate | 2.0 | | 1.5 | | 1.5 | 1.0 | 1.5 | 1.5 | | 1.0 | 2.0 |
| Processing stability: | | | | | | | | | | | |
| Percent haze at 550 mµ | 7.0 | 4.8 | 5.2 | 3.2 | 3.0 | 3.8 | 4.5 | 4.2 | 7.8 | 5.0 | 2.8 |
| Yellowness index, $Y_0$ | 13.0 | 14.7 | 9.3 | 9.4 | 6.0 | 12.3 | 10.0 | 7.4 | 17.2 | 13.1 | 9.8 |
| Yellowness index, $Y_{10}$ | 14.4 | 15.2 | 11.2 | 11.8 | 9.6 | 14.2 | 15.6 | 14.8 | 28.2 | 14.9 | 18.6 |
| Oven stability | 25 | 40 | 30 | 35 | 35 | 30 | 35–40 | 40 | 35–40 | 30 | 30 |

[1] This polyvinyl chloride homopolymer is available commercially from the Monsanto Company as "Opalon 610" and has a viscosity of about 0.31 at 25° C. for a 0.4% (by weight) solution in cyclohexanone.
[2] This polyvinyl chloride homopolymer is available commercially from the Monsanto Company as "Opalon 630" and has a viscosity of about 0.39 at 25° C. for a 0.4% (by weight) solution in cyclohexanone.
[3] This methylmethacrylate/butadiene/styrene polymer is the same as described above in Table 2, footnote [2].
[4] This polyphosphite is the same as described above in Example 1.

Example 16

Each of the blends (comprising polymer composition and stabilizer system of Examples 6, 8, 11 and 15 is used to prepare a plastic container having a volumetric capacity of approximately one pint and having bottom and side wall thicknesses averaging about 0.5 millimeter. Each bottle is transparent and has excellent clarity and color characteristics. Typical extruding and blowing conditions (using a 3½ inch blow molding machine) are as follows:

TABLE 4

Extruding and operating conditions for a 3½ inch blow molding machine

Set temperatures, ° C.
- 1 (Rear) _____ 150
- 2 _____ 160
- 3 _____ 160
- 4 (Front) _____ 160
- 5 (Adaptor) _____ 170
- 6 (Head) _____ 180
- 7 (Die) _____ 200

Operating conditions
- Screw r.p.m. _____ 28
- "Take-off" r.p.m. _____ 5.7
- Pieces/min. _____ 34
- Gross, wt., gr. _____ 44
- Net. wt., gr. _____ 38
- Output, lbs./hr. _____ 198
- Blow air pressure, p.s.i. _____ 70

Example 17

Several heat-fusible stabilized polyvinyl chloride blends (designated respectively as A and B) are prepared using for each blend a preparation procedure as described above in Examples 1 through 4. This procedure involves first blending the respective polymer components together and then thereafter adding to such blend the individual stabilizer components forming a stabilizer composition of this invention. The polyvinyl chloride used is as described in Footnote 1 of Table 2 above. The epoxidized soya bean oil used is like that employed in Example 1. Each blend has the following components:

Formulation—
- Polyvinyl chloride homopolymer _____ 100
- Epoxidized soya bean oil _____ 5
- Calcium stearate _____ 0.05
- Zinc ricinoleate _____ 0.1
- Pentaerythritol _____ 0.2
- Glycerol monostearate _____ 1.5

To these components are added monomeric phosphite (as described in Example 1) and polyphosphite (as described in Example 1); each in the respective amount below indicated in Table 5. Each resulting blend A and B is then tested by the procedure described above to determine its associated yellowness index. The results are recorded in Table 5 below.

TABLE 5

| | Monomeric phosphite | Polyphosphite | Yellowness index | |
|---|---|---|---|---|
| | | | $Y_0$ | $Y_{10}$ |
| A | 0.5 | 0.3 | 6.5 | 9.0 |
| B | 0.3 | 0.5 | 6.1 | 10.9 |

These results demonstrate that the stabilizer system used has excellent color properties in transparent heat-fusible polyvinyl chloride blends.

Example 18

A series of heat-fusible stabilizer polyvinyl chloride blends (designated respectively as A and B) are prepared using for each blend a preparation procedure as described above in Examples 1 through 4. This procedure involves first blending the respective polymer components together and then thereafter adding to such blend the individual stabilizer components forming a stabilizer composition of this invention. The polyvinyl chloride used is as described in Footnote 1 of Table 2 above. The epoxidized soya bean oil used is like that employed in Example 1. The poly(methylmethacrylate/butadiene/styrene) is as described in Footnote 2 of Table 2.

Each blend has the following components:

Formulation:
- Polyvinyl chloride homopolymer _____ 90
- Poly(methylmethacrylate/butadiene/styrene) _____ 10
- Epoxidized soya bean oil _____ 5
- Calcium stearate _____ 0.25
- Zinc ricinoleate _____ 0.20
- Pentaerythritol _____ 0.40
- Glycerol monostearate _____ 1.50

To these components are added monomeric phosphite (as described in Example 1) and polyphosphite (as described in Example 1); each in the respective amount below indicated in Table 6. Each resulting blend A and B is then tested by the procedure described above to determine its associated yellowness index. The results are recorded in Table 6 below.

TABLE 6

| | Monomeric phosphite, TNPP | Polymeric phosphite | Yellowness index | |
|---|---|---|---|---|
| | | | $Y_0$ | $Y_{10}$ |
| A | 0.8 | 0. | 11.4 | 16.0 |
| B | 0.3 | 0.5 | 6.3 | 11.6 |

These results demonstrate that the stabilizer system used has excellent color properties in transparent heat-fusible polyvinyl chloride blends.

What is claimed is:
1. A stabilizer composition adapted for use in the manufacture of heat fusible stabilized polyvinyl chloride blends comprising:
   from about .02 to 0.5 part by weight of at least one compound selected from the group consisting of zinc salts of long-chain monocarboxylic fatty acids each having a molecular weight of from about 100 through 300,
   from about 0.02 to 1.0 part by weight of at least one second salt selected from the group consisting of aluminum, calcium and magnesium salts of long-chain monocarboxylic fatty acids each having a molecular weight of from about 100 through 300,
   from about 1.0 to 30.0 parts by weight of an epoxidized organic material having an oxirane number of from about 3.5 through 13.0 and having a molecular weight of from about 275 through 1800,
   from about 0.01 to 3.0 parts by weight of a tri-substituted organo monophosphite free from hydroxyl groups having from about 5 through 21 carbon atoms per substituent group, and
   from about .05 to 3.0 parts by weight of a tri-substituted organo polyphosphite having the structure:

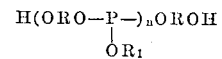

where R is the divalent residue of hydrogenated 4,4'-isopropylidene diphenol, $R_1$ is selected from the group consisting of aryl of 6 through 10 carbon atoms each, alkyl of 1 through 20 carbon atoms each, and $n$ is an integer of at least 2.

2. The stabilizer composition of claim 1 wherein the metal of said second salt is calcium.

3. The stabilizer composition of claim 1 wherein said epoxidized organic material is an epoxidized vegetable oil having an oxirane number of from about 6.0 through 7.1, an iodine number below about 6, and an average molecular weight between about 800 and 1200.

4. The stabilizer composition of claim 1 wherein said tri-substituted organo monophosphite is tris(p-nonylphenyl)phosphite.

5. The stabilizer composition of claim 1 additionally containing up to about 2.0 parts by weight of a polyhydroxy aliphatic alcohol having from about three through 10 carbon atoms per molecule and having from about three through 8 hydroxyl groups per molecule.

6. The stabilizer composition of claim 5 wherein said polyhydroxy aliphatic alcohol is pentaerythritol.

7. The stabilizer composition of claim 1 additionally containing up to about 0.25 part by weight of a stannous salt of a long-chain monocarboxylic fatty acid having a molecular weight of from about 100 through 300.

8. The stabilizer composition of claim 1 additionally containing up to about 3.0 parts by weight of a monoester of a long-chain monocarboxylic fatty acid having a molecular weight of from about 50 through 300 with a polyhydroxy aliphatic alcohol having from about 3 through 10 carbon atoms per molecule and having from about three through 8 hydroxyl groups per molecule.

9. A stabilizer composition comprising:
from about 0.08 through 0.20 part by weight of at least one first salt selected from the group consisting of zinc salts of long-chain monocarboxylic fatty acids each having a molecular weight of from about 100 through 300,
from about 0.02 through 0.75 part by weight of at least one second salt selected from the group consisting of aluminum, calcium and magnesium salts of long-chain monocarboxylic fatty acids each having a molecular weight of from about 100 through 300,
from about 3 through 7 parts by weight of an epoxidized organic material having an oxirane number of from about 3.5 through 13.0 and having a molecular weight of from about 275 through 1800,
from about 0.1 through 1 part by weight of a tri-substituted organo monophosphite free from hydroxyl groups having from about 5 through 21 carbon atoms per substituent group, and
from about 0.2 through 0.7 part by weight of a tri-substituted organo polyphosphite having the structure:

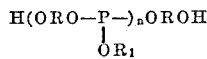

where R is the divalent residue of hydrogenated 4,4'-isopropylidene diphenol, $R_1$ is at least one member selected from the group consisting of aryl of 6 through 10 carbon atom each, and alkyl of 1 through 20 carbon atoms each, and $n$ is an integer of at least 2.

10. The stabilizer composition of claim 9 additionally containing from about 0.1 through 0.5 part by weight of a polyhydroxy aliphatic alcohol having from about 3 through 10 carbon atoms per molecule and having from about 3 through 8 hydroxyl groups per molecule.

11. The stabilizer composition of claim 9 additionally containing from about 0.5 to 2.0 parts by weight of a monoester of a long-chain monocarboxylic fatty acid having a molecular weight of from about 50 through 300 with a polyhydroxy aliphatic alcohol having from about 3 through 10 carbon atoms per molecule and having from about three through 8 hydroxy groups per molecule.

12. The stabilizer composition of claim 9 additionally containing about 0.25 part by weight of a stannous salt of a long-chain monocarboxylic fatty acid having a molecular weight of from about 100 through 300.

13. A stabilizer composition comprising:
from about 0.08 through 0.20 part by weight of a zinc salt of long-chain monocarboxylic fatty acids each having a molecular weight of fram about 100 through 300,
from about 0.02 through 0.75 part by weight of a calcium salt of long-chain monocarboxylic fatty acids each having a molecular weight of from about 100 through 300,
from about 3 through 7 parts by weight of an epoxidized vegetable oil having an oxirane number of at least about 6, and iodine number below about 6, and an average molecular weight between about 600 and 1200,
from about 0.1 to 1 part by weight of tris(p-nonylphenyl) phosphite,
from about 0.2 to 0.7 part by weight of the hydrogenated 4,4'-isopropylidene-diphenol-phosphite ester product produced by the condensation of about 1 mole of triphenyl phosphite and about 1.5 moles of hydrogenated 4,4'-isopropylidene-diphenol such that the finished product has a molecular weight in the range of from about 2,400 through 3,000 and a phosphorus content of about 6.2 through 6.9 percent,
from about 0.1 to 0.5 part by weight of pentaerythritol, and
about 0.25 part by weight of a stannous salt of a long-chain monocarboxylic fatty acid having a molecular weight of from about 100 through 300.

14. A heat fusible, stabilized polyvinyl chloride blend comprising:
(a) a polymer composition comprising at least about 70 parts by weight based on total polymer of polyvinyl chloride with the balance up to 100 parts by weight being a graft copolymer of methylmethacrylate/styrene superstrate on butadiene/styrene substrate,
(b) a stabilizer composition of claim 1, and
(c) said blend containing for each 100 parts by weight of said polymer composition from about 2 through 40 parts of said stabilizer composition.

15. The blend of claim 14 wherein said polymer composition consists essentially of vinyl chloride homopolymer.

16. The blend of claim 14 wherein said polymer composition consists essentially of from about 3 to 20 parts by weight of said graft copolymer for each 100 parts by weight of said polyvinyl chloride.

17. A heat fusible, stabilized polyvinyl chloride blend containing:
(a) a polymer composition comprising at least about 70 parts by weight based on total polymer of polyvinyl chloride with the balance up to 100 parts by weight being a graft copolymer of methylmethacrylate/styrene superstate on butadiene/styrene substrate,
(b) a stabilizer composition of claim 13, and
(c) said blend containing for each 100 parts by weight of said polymer composition from about 2 through 40 parts of said stabilizer composition.

18. As an article of manufacture, a container having integral bottom wall portions and side wall portions which together define and enclose a centrally disposed cavity, said wall portions further having defined therein orifice means for ingress and egress into said cavity, said container being formed by blow molding a blend of claim 14.

19. As an article of manufacture, a container having integral bottom wall portions and side wall portions which together define and enclose a centrally disposed cavity, said wall portions further having defined therein orifice means for ingress and egress into said cavity, said container being formed by blow molding a blend of claim 17.

References Cited

UNITED STATES PATENTS

| | | | |
|---|---|---|---|
| 2,711,401 | 6/1955 | Lally | 260—45.75 |
| 2,734,881 | 2/1956 | Lally et al. | 260—23 |
| 2,953,537 | 9/1960 | McBrien | 260—23 |
| 3,003,999 | 10/1961 | Kander et al. | 260—45.75 |
| 3,341,629 | 9/1967 | Larrison | 260—928 |
| 3,367,997 | 2/1968 | Smith | 260—23X |
| 3,396,132 | 8/1968 | Perry et al. | 260—23 |
| 3,453,225 | 7/1969 | Pollock | 260—23 |

DONALD E. CZAJA, Primary Examiner

D. J. BARRACK, Assistant Examiner

U.S. Cl. X.R.

252—400; 260—23.7, 45.7, 45.75, 45.8, 45.85, 45.95, 876, 880, 890, 899